United States Patent [19]

Fletcher et al.

[11] Patent Number: 4,562,580

[45] Date of Patent: Dec. 31, 1985

[54] PHOTOLYTIC IMPROVEMENT OF DYE LASER LIFETIMES

[75] Inventors: Aaron N. Fletcher, Ridgecrest; Richard H. Knipe, Los Osos, both of Calif.

[73] Assignee: The United States of America as represented by the Secretary of the Navy, Washington, D.C.

[21] Appl. No.: 635,316

[22] Filed: Jul. 27, 1984

[51] Int. Cl.$^4$ .............................................. H01S 3/09
[52] U.S. Cl. ....................................... 372/69; 372/53; 372/54
[58] Field of Search .............................. 372/54, 53, 69

[56] References Cited

U.S. PATENT DOCUMENTS

| | | | |
|---|---|---|---|
| 3,521,187 | 7/1970 | Snavely et al. | 331/94.5 |
| 3,736,524 | 5/1973 | Drexhage | 331/94.5 |
| 3,781,700 | 12/1973 | Hansch et al. | 330/4.3 |
| 3,858,124 | 12/1974 | Bass et al. | 332/7.51 |
| 3,902,130 | 8/1975 | Pike | 330/4.3 |
| 4,051,062 | 9/1977 | Hammond et al. | 252/301.17 |
| 4,103,256 | 7/1978 | Hammond et al. | 331/94.5 L |
| 4,150,341 | 4/1979 | Ferguson | 331/94.5 C |
| 4,173,002 | 10/1979 | Fine et al. | 331/94.5 L |
| 4,479,223 | 10/1984 | Fletcher | 372/54 |

Primary Examiner—William L. Sikes
Assistant Examiner—Léon Scott, Jr.
Attorney, Agent, or Firm—Robert F. Beers; W. Thom Skeer; Shelley G. Precivale

[57] ABSTRACT

The effective lasing lifetime of coumarin 102 in 50:50 ethylene glycol is significantly extended by increasing the rate of pumping and photolysis, with a flashlamp in a laser system having a pyrex ultraviolet filter and an inert cover gas.

4 Claims, 1 Drawing Figure

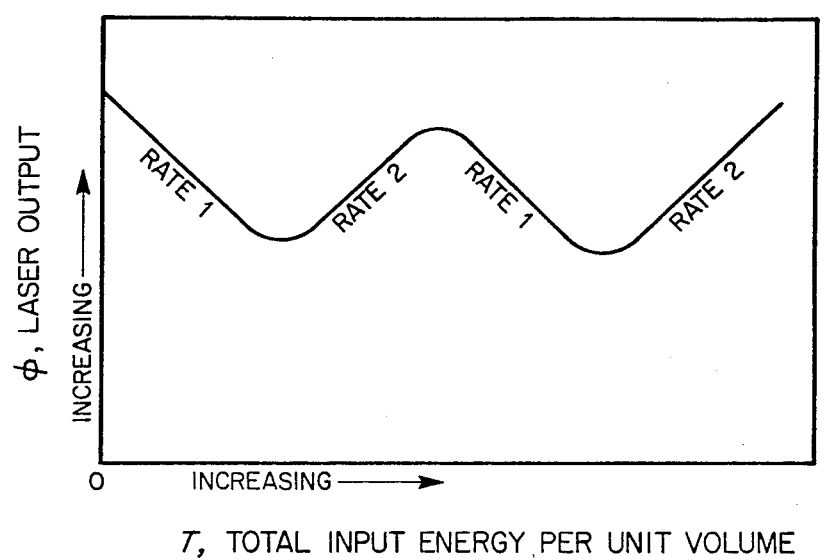

PHOTOLYTIC IMPROVEMENT OF DYE LASER LIFETIMES

BACKGROUND OF THE INVENTION

1. Field of the Invention

This invention relates to the field of chemistry. More particularly, this invention relates to dye lasers. Still more particularly, but without limitation thereto, this invention relates to dye lasers having extended operating lifetimes.

2. Description of the Prior Art

It is well known that complex organic dye molecules can be induced to emit coherent laser light. The active medium of a typical organic dye laser consists of a dilute solution of the organic material dissolved in a common solvent such as water or alcohol.

The term "dye" laser is derived from several classes of organic dye compounds in which lasing has been produced. However, a great number of compounds useful in dye lasers do not fit the general classification of organic dyes. A major advantage of the organic dye laser is its tunability. That is, the output of an individual laser can be changed continuously over a range of wavelengths. This feature makes the dye laser particularly suitable for use in isotope separation processes based on selective photoexcitation of a particular isotopic species, since the narrow bandwidth and exact wavelength requirements of the excitation source generally require that a finely tunable laser be used.

A major drawback of the prior art dye laser employing coumarin dyes as well as other dyes has been the failure of the dye solution to continue lasing after a short period of time due to degradation of the dye solution. In order to lengthen the effective lasing lifetime of the coumarin dyes, various techniques have been attempted in the prior art. They include: (1) to completely absorb the laser dye out of the dye solution; (2) to absorb the reaction intermediates out of the dye solution and slow down the dye degradation process; (3) to control the wavelength of excitation to which the dye is exposed; and (4) to use an inert gas rather than air as the cover gas over the dye solution. Optionally, some other methods would just change the dye and solvent to obtain the desired results.

The present invention provides a "clean" way to extend dye lifetimes, "clean" in the respect that the use of absorptive materials or additives would not be needed. These latter factors, as are commonly used in the prior art, can also contaminate, slow down, or markedly increase the complexity of the dye solution handling procedures.

SUMMARY OF THE INVENTION

An object of the present invention is to provide a method of operating a dye laser system employing coumarin dyes.

A further object of the present invention is to provide a method of operating a dye laser system employing coumarin dyes as a lasing medium whose lifetimes are substantially extended over prior art techniques.

These and other objects have been demonstrated by the present invention wherein the dye solution comprised of a coumarin laser dye and a solvent are placed in a laser dye cavity, screened from ultraviolet light with a pyrex filter, and then covered with an inert gas. The energy input into the dye solution is then increased by increasing the rate of photolysis (lasing) with a flashlamp. A significantly increased output and lifetime of the laser dye has been observed employing this technique.

BRIEF DESCRIPTION OF THE DRAWING

The single FIGURE of the drawing represents a typical laser dye run of this invention and shows the "yo-yo" effect.

DESCRIPTION OF THE PREFERRED EMBODIMENT

The degradation in performance associated with repetitious use of a laser dye is a result of photo-induced chemical reactions. The predominant cause of degradation is the accumulation of products which absorb at the lasing wavelength. It is expected that the complex organic molecules used as laser dyes have equally complex products which undergo further reaction. R. H. Knipe and A. N. Fletcher, "Effects of Secondary Chemical Reactions Upon the Performance of Laser Dyes," *Journal of Photochemistry* 23, pp. 117–130, October 1983.

It has now been found under specific conditions with respect to the dye/solvent, ultraviolet (UV) filtration, the flow rate volume of dye solution and selected cover gas that increasing the rate of photolysis increases the lifetime of a dye as a lasing medium for selected dye solutions. This is completely contrary to normal expected results. There are cases known where the rate of energy input into a dye laser may be too high for laser action due to the generation of transient photoproducts. This is discussed in Lee et al., *IEEE J. of Quantum Elec.* QE-16, pp. 777–784, July 1980. The heat from the flashlamp has been shown to reduce laser output using a coaxial flashlamp at a fast pulse rate. This is discussed in Fletcher et al., *Applied Physics* 12, pp. 39–44, 1977.

It has never been shown before, where a higher rate results in an increase in the laser output. The opposite effect had been observed earlier in laser output with rhodamine 6G (having tetrafluoroborate or perchlorate anion instead of the chloride of the true 6G) in a variety of solvents under argon where the laser output increased after standing overnight in the dark. At that time it was suggested that the rise was due to slow, non-photolytic "dark" reactions that removed material absorbing at the lasing wavelength.

Similar but opposite phenomena was observed in tests with AC3F in ethanol, under argon, where the laser output would drop after standing overnight in the dark. AC3F belongs to an entirely different dye class and has the following structure:

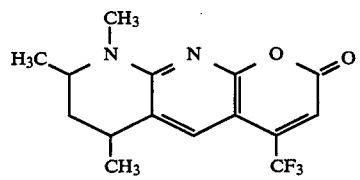

The most dramatic evidence of this phenomena has now been observed in a test with coumarin 102 (Exciton 480) having the structure:

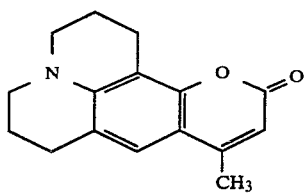

in a 50:50 by volume mixture of ethylene glycol and water. The experimental setup has a UV filter between the flashlamp and the dye solution. Changing the rate of pumping the degradation lamp between 0, 10 and 20 Hz, gives a corresponding change in laser output. A "yo-yo" effect is obtained with high laser output corresponding to higher rates of input. This rate is distinct from total input energy as the latter term is acting to decrease laser action through both bleaching the dye and introducing products which absorb at the lasing wavelength.

The method of this invention would allow an increase in the average number of photons put into the dye solution per unit volume for a given decrease in laser output. Its usefulness becomes apparent when it is required to run a laser at a very high rate since a minimum amount of dye is needed to maintain the value of the laser output. Improved dye lifetime allows use of less dye which results in reduced size and volume requirements.

By operating with "units" of a dye solution whose volume is sufficient to control temperature and large enough so that circulation is not so fast as to degrade laser output by transient photoproducts i.e. rapidly disappearing photoproducts, a longer overall lifetime of the total number of "units" is obtained as compared to working with a single equivalent volume of dye solution.

A term has been developed as a relative measure of laser output. This term is given the designation "figure of merit" (FOM) and its value is determined by dividing the initial slope efficiency, $k_o$, by the lifetime constant c. The larger the FOM, the greater the summation of laser output will be. Tables 1 through 3 show these values for a variety of conditions.

TABLE 1

FOM Value for Coumarin 102 (Exciton 480) in Ethanol at Varying Pulse Rates

| Run no. | Cover gas | Degradation rate, Hz | Slope efficiency $k_o \times 10^3$ | FOM, kJdm$^{-3}$ $k_o/c$ |
|---|---|---|---|---|
| 6611 | Argon | 25 | 1.5 | 7.7 |
| 6619 | Argon | 2, 5 | 1.6 | 8.7 |
| | | | Submean | 8.2 |
| 6613 | Air (static) | 25 | 1.5 | 1.1 |
| 6617 | Air (dynamic) | 20 | 1.5 | 0.9 |
| 6623 | Air (dynamic) | 0.6, 2, 5 | 1.6 | 1.1 |
| | | | Submean | 1.0 |
| 6618 | Oxygen | 2, 5 | 1.1 | 0.3 |

TABLE 2

FOM Values for Coumarin 102 (Exciton 480) in 50:50 by Volume Ethanol:Water at Varying Pulse Rates

| Run no. | Cover gas | Degradation rate, Hz | Slope efficiency $k_o \times 10^3$ | FOM, kJdm$^{-3}$ $k_o/c$ |
|---|---|---|---|---|
| 6627 | Argon | 2, 10, 20 | 1.9 | 17 |
| 6625 | Air | 0.6, 2, 10 | 2.3 | 5 |

TABLE 3

FOM Values for Coumarin 102 (Exciton 480) in 50:50 by Volume Ethylene Glycol:Water at Varying Pulse Rates

| Run no. | Cover gas | Degradation rate, Hz | Slope efficiency $k_o \times 10^3$ | FOM, kJdm$^{-3}$ $k_o/c$ |
|---|---|---|---|---|
| 6614 | Argon | 9 | 0.92 | 11.0 |
| 6614 | Argon | 20 | 1.00 | 84.0 |
| 6629 | Argon (after air) | 25 | — | 36.0 |
| 6631 | Argon | 25 | — | 95.0 |
| 6629 | Air (dynamic) | 0.6, 5 | 2.2 | 1.0 |

Some basic assumptions are made in calculating the dye lifetime constants (c). It is assumed that each input flash causes a proportionate amount of bleaching of the dye and the creation of a small amount of a permanent photoproduct, designated by L(P), that absorbs at the lasing wavelength. L(P) gradually accumulates with increased use of the laser or degradation lamp and eventually reduces lasing action to the point where operational requirements cannot be met. Another requirement when the degradation lamp is used is that stimulated emission either does not affect the photolysis route for the formation of L(P) or else affects the photolysis in a negligible amount. In either case, the 1/c lifetime values determined with a degradation lamp are found to be slightly smaller than those determined where stimulated emission made a significant effect upon the rate of photolysis.

The photoproduct L, is also present in a nonpermanent form L(X). For a number of rhodamine dyes where no UV filter is used, L(X) is present since the laser output increases overnight. For the coumarin dyes using the pyrex filter, the opposite effect is noted. There is a slight decrease in laser action overnight. In order to account for this, a product X must be created by photolysis and undergo a dark reaction, i.e. a reaction occurs without the need for photolysis. X then undergoes a dark reaction to form products, P, which absorb at the lasing wavelength to a lesser degree than X. Another observation that frequently occurs with coumarin dyes using a UV filter is a very rapid drop in output for a short portion of the initial output. This drop is also a result of the reaction mechanism creating or removing materials that absorb at the lasing wavelength.

Under very specific conditions the mechanism can be affected so as to change L both up and down in concentration. The laser output then changes like a "yo-yo" as a result of changes in the rate of photolysis. The deviation from the degradation equation can be treated as shifts from the steady state equilibrium created by the effect of a specific photolysis rate upon L(V), the product created by dark reaction of L(X), and is illustrated in the FIGURE.

The experimental conditions are as follows. A triaxial flashlamp is used for the test laser. A pyrex filter is used to separate the dye from the coolant and to remove the UV portion of the flashlamp radiation (UV filtration).

In addition, a water-cooled linear flashlamp is inserted in the return flow from the test laser to the storage and mixing vessel of the dye flow system. This provides a laser-like environment without mirrors capable of rapidly subjecting the dye solution to large quantities of radiation. The linear lamp is run at 10J per shot at pulse rates varying from 1-25 Hz.

The FIGURE shows a typical dye run. The vertical axis shows the laser output $\phi$ and the horizontal axis shows the total input energy per unit volume, T. The graph charted is a general representation of the "yo-yo" effect as the input rate alternates between Rate 1 and Rate 2.

EXAMPLE 1

The "yo-yo" effect upon laser output caused by changes in the rate of the degradation lamp was first observed in run 6614, Table 3. The dye was coumarin 102 (Exciton 480).

A 600 ml. solution (0.0002M) of coumarin 102 is prepared in 50:50 by volume ethylene glycol:water, with argon as a cover gas.

The initial output is measured with the linear flashlamp off for at least two different input energies. Referring to the FIGURE, the output is measured for an input rate of 9 Hz (Rate 1), then 20 Hz (Rate 2). The input rate is then 9 Hz (Rate 1) again. The system is then run at 20 Hz (Rate 2) overnight. Subsequently the rate is again reduced to 9 Hz.

After equilibrium is established, the 20 Hz data can be assembled and a lifetime measured as if the slower rates had not occurred.

EXAMPLE 2

Run 6631 is the counterpart of run 6614. The relevant data is tabulated in Table 3.

The output is measured for an initial input of 25 Hz. The rate is then reduced to 1 Hz, at which point the output drops markedly. The system is shut down after the 1 Hz except for the continued flow of purified argon. Subsequently the rate is again run at 25 Hz.

Both of the above-mentioned examples utilize a coumarin 102/ethylene glycol/water system. As is shown in Table 3, the FOM values are relatively higher than those for ethanol (Table 1) and ethanol/water (Table 2) systems. This is desirable as the higher FOM values indicate a larger value for the summation of laser output.

Table 3 further indicates that argon is a desirable cover gas since the runs which utilize air exhibit lower FOM values.

EXAMPLE 3

A 600 ml. solution (0.0002M) of laser dye AC3F is prepared in ethanol, with argon as a cover gas. Test conditions are similar to those of examples 1 and 2, described above.

The system is run at an input rate of 25 Hz then is shut off overnight. The laser output drops overnight when the input rate is 0 Hz and then increases slightly when the input is resumed at 25 Hz.

The data is then tabulated to obtain a $k_o$ value of $1.4 \times 10^{-3}$. From this value, the FOM is calculated to be 320 kJdm$^{-3}$.

The actual device used would depend upon the complexity warranted by the application. The best system would be where a "unit" was used and then discarded or stored for reclamation. The system could, alternatively, return the "unit" volume to the original dye reservoir. Another system could have the "unit" in direct contact with the bulk of the dye reservoir and slow interchange could occur. This concept assumes that usage of "unit" size volumes is sufficient to warrant the use of "units" of volume, i.e. single pulses five minutes apart might not yield the power density per unit volume needed to photolyze the lasing wavelength absorbing photoproducts. However, if average power out is not a restriction, operating at a higher average power would yield a longer lifetime for the indicated dyes and solutions for a given volume than would a lower average power, i.e. a larger volume of dye solution could result in a lower lifetime value 1/c, for the same pump rate. Therefore, for purposes of this invention, best results are noted with use of a minimal volume of dye solution.

Photolysis of the system would best be obtained through a separate discharge or photolysis tube emitting at a specific wavelength of excitation that will photolyze the product absorbing at the lasing wavelength (L) and not photolyze the dye itself.

Several solvents may be suitable for use with this invention. The one contemplated by this invention is ethylene glycol/water, which is especially attractive because of its high boiling point, low freezing point and low flammability. This solvent appears to work best with the coumarin 102 dye. Evidence of photolytic improvement is also shown with the dye AC3F in ethanol under argon, but to somewhat of a lesser degree than ethylene glycol/water and coumarin 102.

This invention has been described in detail with particular reference to certain preferred embodiments thereof, but it will be understood that variations and modifications can be effected within the spirit and scope of the invention.

What is claimed is:

1. A method for photolytically extending the lifetime and output of dye lasers in a laser system comprising the steps of:
   placing a dye solution comprising a coumarin laser dye and a solvent into a dye laser cavity;
   screening said system from ultraviolet light with a pyrex filter;
   covering said dye solution with an inert gas; and
   increasing the rate of photolysis with a flashlamp which emits at a specific excitation wavelength that will photolyze products absorbing at the lasing wavelength and not photolyze that dye it self thereby increasing the energy input into said dye solution such that an increased output and dye lifetime are obtained.

2. The method of claim 1 wherein said inert gas is argon.

3. The method of claim 2 wherein said dye solution comprises coumarin dye laser 102 in a solvent of 50 percent by volume ethylene glycol and 50 percent by volume water.

4. The method of claim 2 wherein said dye solution comprises dye laser AC3F in a solvent of ethanol.

* * * * *